Sept. 9, 1941.       H. G. MORAN              2,255,267
                     DENTAL APPLIANCE
                     Filed May 18, 1940
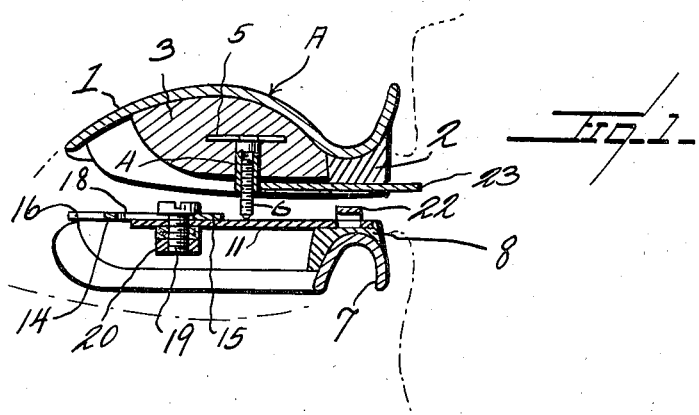
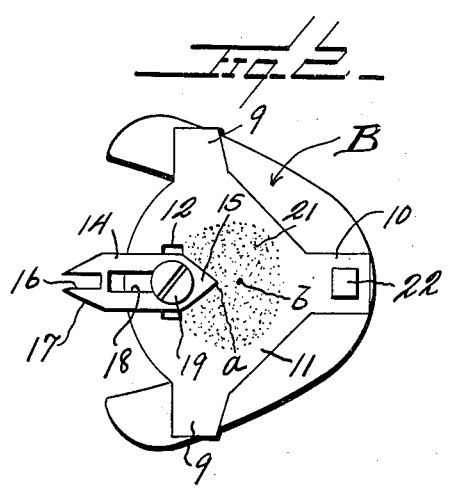
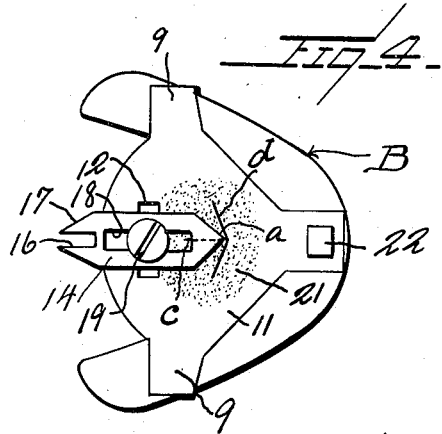
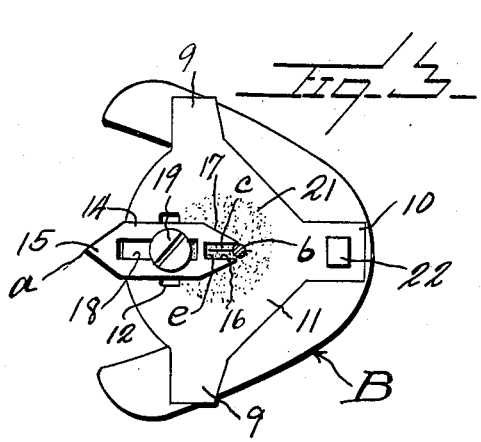
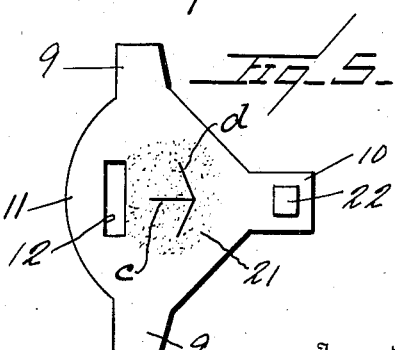
Inventor
H. G. Moran
By Watson E. Coleman
Attorney Patented Sept. 9, 1941

2,255,267

UNITED STATES PATENT OFFICE 2,255,267

DENTAL APPLIANCE

Hugh G. Moran, St. Louis, Mo.

Application May 18, 1940, Serial No. 336,036

2 Claims. (Cl. 32—19)

This invention relates to a dental appliance, and it is primarily an object of the invention to provide a device of this kind for locating, maintaining and recording the functional relation of the mandible to the maxilla in edentulous mouths and in a manner whereby such functional relation may be transferred to the mechanical articulator.

It is also an object of the invention to provide an appliance of this kind comprising two separate members one for placement within the upper portion of the oral cavity and the other in the lower portion of the oral cavity, together with coacting means carried by said members to provide records to be employed for accurately adjusting the condyle paths of an articulator in accordance with the jaw relations of the patient, said coacting means including a lock plate for holding the mandible retruded without interfering with the lateral movements of the mandible while locked in retruded position.

The invention consists in the details of construction and in the combination and arrangement of the several parts of my improved dental appliance whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:

Figure 1 is a vertical sectional view taken through an appliance constructed in accordance with an embodiment of my invention and in applied position within an oral cavity, such cavity being diagrammatically indicated by broken lines;

Figure 2 is a view in top plan of the member of the appliance for the lower portion of the oral cavity showing the initial recording thereon;

Figure 3 is a view similar to Figure 2 with a part of the member for the upper portion of the oral cavity in section and with the lock plate in position for functioning as a guide in determining the centric occlusion based upon full retrusion of the mandible;

Figure 4 is a view similar to Figure 2 with the lock plate in position to hold the mandible fully retruded but allowing unhindered lateral movement of the mandible;

Figure 5 is a view in top plan of the recording plate as comprised in the member for the lower part of the oral cavity and illustrating the gothic arch recorded thereon bisected by the registration made on the plate as a result of the protrusive and retrusive movements of the mandible.

As disclosed in the accompanying drawing, my improved dental appliance comprises two members A and B; the member A is for placement within the upper portion of the oral cavity and the member B for placement within the lower portion of the oral cavity as clearly indicated in Figure 1 of the drawing.

The member A comprises a trial or base plate 1 properly fitting within the upper portion of an edentulous mouth and having the usual bite rim 2. Within the field of the plate 1 and adhering to said plate is a body 3 of wax or other suitable material in which is embedded an end portion of a tubular stem 4. To facilitate the maintenance of this stem 4 in desired position, the inserted end of the stem 4 is provided with a relatively large flat head 5 which may be of any shape or design preferred. This stem 4 has its end portion embedded within the body 3 of wax or kindred material at substantially the center of the trial or base plate 1.

Threading within this tubular stem 4 is an elongated straight stylus 6 which is adapted to be extended or retracted with respect to the outer end of the stem 4 as may be required in order to support or hold the lower mandible in desired relation with respect to the maxilla.

The lower member B, as herein embodied, comprises a trial or base plate 7 to properly fit upon the lower gum of an edentulous mouth and which is provided with the usual bite rim 8 of wax or kindred material. Adhesively held to the bite rim 8 as a result of suitable pressure are the laterally and forwardly disposed flat lugs 9 and the forwardly disposed flat lug 10 integral with and also coplanar with a recording plate 11.

The lug 10 extends across the bite rim 8 at the transverse center line of the trial or base plate 7 and the rear portion of the plate 11 is provided in its central part with an elongated slot 12 at right angles to the transverse center line of the plate 11 and extending equidistantly beyond opposite sides of such center line. Resting upon the rear portion of the plate 11 is an elongated and relatively narrow lock plate 14. This plate 14 at one end portion is tapered, as at 15, to provide an indicating point $a$ at the transverse center line of the plate 14 or for engagement with the stylus.

The opposite end portion of the plate 14 is provided at its transverse center line with a longitudinally disposed guide slot 16 open at its outer end. The plate 14 at opposite sides of this slot 16 is also tapered, as at 17. This slot 16 is of a width to snugly receive the lower portion of the stylus 6 as particularly illustrated in Figure 3 and for a purpose to be hereinafter more particularly referred to.

The central portion of the plate 14 at its transverse center line is provided with the elongated slot 18 which intersects the slot 12 and disposed through the registering portions of the slots 12 and 18 from above is a clamping screw 19. The lower portion of the screw 19 has threaded thereon a holding nut 20 coacting with the plate 11 in a well known manner to hold the plate 14 in its desired adjusted position.

The central portion of the upper face of the plate 11 has applied thereto a film 21 of a suitable recording material such as a soft dark colored wax, lamp black or of such other material as may be desired.

In practice, the members A and B are placed within the oral cavity without the film 21 of recording material being on the plate 11. The patient is then caused to close the lower mandible and by raising or lowering the stylus 6 proper opening of the mouth may be established or, in other words, proper support for the lower mandible is provided. The film 21 of recording material is then placed upon the upper surface of the plate 11 and the patient told to close the mouth. During this operation the plate 14 is in an out of the way position, such as illustrated in Figure 2. Upon closing of the lower mandible the point of contact b is recorded on the film 21. The plate 14 is then set in the position as illustrated in Figure 3 with the lower portion of the stylus within the outer open extremity of the slot 16 and with the longitudinal axis of such slot 16 at right angles to the slot 12. If the mark or register of the point of contact b should be to one side of the transverse center line of the plate 11, the slot 12 permits the plate 14 to be readily adjusted as necessary along the slot 12 to attain the required placement of the plate 14 as just described with respect to the stylus 6. With the plate 14 in this position as illustrated in Figure 3, the side margins of the slot 16 provide a guiding medium for the stylus as the mandible is protruded or retruded.

After the initial adjustment of the plate 14 as just described, the patient is told to protrude the mandible and then to fully retrude the mandible. This will result in the recording on the film 21 of a substantially straight line c and the outer end of this line c registers the full retruded position of the mandible or the point of center occlusion.

The locking plate 14 is then reversed, as in Figure 4, to bring the point a at the end portion of the plate 14 remote from the slot 16 in register with this point of center occlusion so that the point a will be directly in back of and closely adjacent to the lower end of the stylus 6 of the retruded mandible whereby such mandible is effectively held in full retrusion and locked against protrusion. This effective position of the plate 14 will not, however, offer any hinderance or obstruction to the lateral or side movement of the mandible and which side movements are recorded by the rearwardly diverging and substantially straight lines d, the angle between which is bisected by the recorded line c, the point of intersection of said lines d being, of course, at the point of center occlusion.

It is also to be particularly pointed out that while the tapered end portion 15 of the plate 14 allows for the lateral or side movements of the mandible, said tapered portion serves to assure the maintenance of the mandible at its full retrusion. The recording on the film 21 is particularly illustrated in Figure 5 of the drawing and it is to be noted that the lines d will in every instance offer an obtuse or Gothic arch.

After this recording d of the lateral movements of the mandible, the plate 14 is then returned to the position as illustrated in Figure 3 and then forwardly adjusted to bring the inner edge e of the slot 16 over the apex of the Gothic arch as traced by the lateral lines d and bisected by the protrusive and retrusive movements of the mandible. The plate 14 is then firmly locked by the screw 19 to the plate 11.

Upon closing the lower mandible the outer end of the stylus 6 will drop into the inner portion of the slot 16 and in contact with the plate 11. This contact will be effectively held and in a manner whereby the mandible is incapable of movement in any direction. While held in this position, the trial or base plates 1 and 7 are locked together in a conventional manner and removed from the mouth for transfer to the articulator.

In connection with devices or apparatus of the kind herein disclosed it is well known in the dental profession to provide means whereby the Gothic arch as traced on the plate 11 may also take place in view or exteriorly of the patient's mouth. This is done by employing a tracing plate and a supplemental stylus. For this purpose the lug 10 of the plate 11 is formed to provide an upstanding loop 22 whereby an exterior recording plate may be operatively engaged with the plate 11. The lower portion of the stem 4 carries the forwardly directed elongated arm 23 of a length to extend beyond the bite rim 2 so that a stylus may be mounted thereon for desired coaction with the applied exterior recording plate.

From the foregoing description it is thought to be obvious that a dental appliance constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. An apparatus of the class described comprising trial plates to be fitted within the upper and lower portions of an oral cavity, a stylus carried by one of the trial plates, a recording plate carried by the second trial plate, said recording plate contacting the stylus to support the mandible, a reversible lock plate at the rear portion of the recording plate, one end portion of such lock plate being tapered to provide a point for engagement with the stylus when the mandible is fully retruded but allowing transverse movement of the mandible, the opposite end portion of the lock plate being provided with a slot to align with the point at the opposite end of the lock plate, said slot being open at its outer end, said slot serving as a guide for the stylus upon protrusion and retrusion of the mandible, the inner end of the slot also serving when in contact with the stylus for locking the mandible against protrusion and also locking the mandible against lateral movement, the intermediate portion of the lock plate having a longitudinally disposed slot, and a holding member disposed through said slot and the recording plate for clamping the lock plate in its various positions.

2. An apparatus of the class described comprising trial plates to be fitted within the upper and lower portions of an oral cavity, a stylus carried by one of the trial plates, a recording plate carried by the second trial plate, said recording plate contacting the stylus to support the mandible, a reversible lock plate at the rear portion of the recording plate, one end portion of such lock plate being tapered to provide a point for engagement with the stylus when the mandible is fully retruded but allowing transverse movement of the mandible, the opposite end portion of the lock plate being provided with a slot to align with the point at the opposite end of the lock plate, said slot being open at its outer end, said slot serving as a guide for the stylus upon protrusion and retrusion of the mandible, the inner end of the slot also serving when in contact with the stylus for locking the mandible against protrusion and also locking the mandible against lateral movement, the intermediate portion of the lock plate having a longitudinally disposed slot, and a holding member disposed through said slot and the recording plate for clamping the lock plate in its various positions, said recording plate having a transversely disposed slot through which the holding member is directed, said transverse slot allowing a transverse adjustment of the lock plate.

HUGH G. MORAN.